US012603556B2

(12) United States Patent
Laldin

(10) Patent No.: US 12,603,556 B2
(45) Date of Patent: Apr. 14, 2026

(54) WIDE-SPEED MULTIPLE INTERIOR ROTOR EXCITATION MACHINE

(71) Applicant: Gentiam LLC, Hermosa Beach, CA (US)

(72) Inventor: Omar Laldin, Hermosa Beach, CA (US)

(73) Assignee: Gentiam LLC, Oakland, CA (US)

( * ) Notice: Subject to any disclaimer, the term of this patent is extended or adjusted under 35 U.S.C. 154(b) by 528 days.

(21) Appl. No.: 17/759,882

(22) PCT Filed: Dec. 8, 2020

(86) PCT No.: PCT/US2020/063761
§ 371 (c)(1),
(2) Date: Aug. 1, 2022

(87) PCT Pub. No.: WO2021/162771
PCT Pub. Date: Aug. 19, 2021

(65) Prior Publication Data
US 2023/0344326 A1    Oct. 26, 2023

Related U.S. Application Data

(60) Provisional application No. 62/976,658, filed on Feb. 14, 2020.

(51) Int. Cl.
| | |
|---|---|
| *H02K 1/22* | (2006.01) |
| *H02K 1/26* | (2006.01) |
| *H02K 1/276* | (2022.01) |
| *H02K 21/04* | (2006.01) |

(52) U.S. Cl.
CPC ........... *H02K 21/042* (2013.01); *H02K 1/223* (2013.01); *H02K 1/265* (2013.01); *H02K 1/276* (2013.01)

(58) Field of Classification Search
CPC ..................... H02K 1/22–1/325; H02K 1/223
See application file for complete search history.

(56) References Cited

U.S. PATENT DOCUMENTS

| | | | |
|---|---|---|---|
| 2007/0096579 A1 | 5/2007 | Aydin et al. | |
| 2008/0129243 A1* | 6/2008 | Nashiki ..................... | H02K 3/28 318/701 |
| 2009/0026999 A1* | 1/2009 | Atarashi .............. | H02K 1/2796 318/720 |
| 2009/0261774 A1 | 10/2009 | Yuuki et al. | |
| 2014/0028160 A1 | 1/2014 | Yamada et al. | |

(Continued)

*Primary Examiner* — Sean Kayes
(74) *Attorney, Agent, or Firm* — Ginger G. Turner

(57) ABSTRACT

Example electric machines presented herein generally include an embedded rotor slot geometry that can promote rotor q-axis flux linkage. The slot geometry can form concentric branches of magnetic material between slots that follow curvature of q-axis flux when current is flowed through rotor q-axis field windings positioned within a first portion of the slots. Current direction through rotor q-axis field windings can be aligned within a single pole and alternate in direction between poles so that q-axis flux from adjacent poles is additive along q-axes. A second portion of the slots can include rotor d-axis field windings positioned therein and configured to produce flux on the d-axis. A portion of the rotor d-axis field windings and/or rotor q-axis field windings can be replaced with magnets to achieve differing torque and efficiency profiles.

18 Claims, 8 Drawing Sheets

(56)          References Cited

U.S. PATENT DOCUMENTS

2014/0375233 A1*  12/2014  Blasko ................... H02P 21/00
                                                318/400.02
2015/0115758 A1    4/2015  Koka et al.
2015/0229170 A1    8/2015  Koechlin
2015/0288233 A1   10/2015  Kim et al.
2020/0403468 A1*  12/2020  Takahashi ............. H02K 9/197
2022/0190761 A1*   6/2022  Kondo ................... H02P 21/22

* cited by examiner

WIDE-SPEED MULTIPLE INTERIOR ROTOR EXCITATION MACHINE

CROSS-REFERENCE TO RELATED APPLICATIONS

The present U.S. patent application is a U.S. National Phase Application under 35 U.S.C. § 371 of International Patent Application No. PCT/US2020/063761 filed Dec. 8, 2020, which is related to and claims the priority benefit of U.S. Provisional Patent Application Ser. No. 62/976,658, titled "A WIDE-SPEED DUAL INTERIOR ROTOR EXCITATION MACHINE" filed Feb. 14, 2020, the contents of each of which are hereby incorporated by reference in their entirety into the present disclosure.

FIELD

The present invention generally relates to rotating electric machines and particularly to electrical machines having rotors with field windings or with both permanent magnets and field windings.

BACKGROUND

This section introduces aspects that may help facilitate a better understanding of the disclosure. Accordingly, these statements are to be read in this light and are not to be understood as admissions about what is or is not prior art.

Generally, an electric machine can be used as a motor to convert electrical energy into mechanical energy or as a generator to convert mechanical energy to electrical energy. A rotating electric machine includes stator which is typically stationary and a rotor that rotates within the stator. The stator typically has multiple conductive electric windings (also referred to herein as "stator field windings") while the rotor can include conductive field windings (field-wound machines), permanent magnets (permanent magnet, "PM", machines), or both (hybrid machines).

In the design of electric machines, placement of steel, magnets, conductor windings, and structural components within the stator and rotor is a significant factor in the performance metrics of the machine which, among others, include maximizing torque density, power density, base speed, and efficiency, while reducing cost, unwanted machine noise, vibrations, torque ripple, and harmonics.

In light, small, and medium electric vehicle applications, the market generally places less emphasis on the high performance attributes of these vehicles such as acceleration times to rated speed. On the other hand, maximizing vehicle range is a key design target, with these vehicles being extremely constrained in size and therefore available volume, resulting in similarly tight requirements being imposed on the efficiency and size of the electrical machine. In addition, the vehicles are highly cost-constrained and in some cases, such as for personal mobility applications, the price of the electric motor contained therein can become a significant percentage of the overall vehicle cost. As a result of these considerations, the operating points typically experienced by the motor include those at lower torque and over a wide speed range, complemented by short bursts of peak torques that may be particularly high with respect to machine size, required during sudden acceleration and regenerative braking events. Collectively, achieving these targets poses significant overall design challenges.

Interior permanent magnet (IPM) motors are PM machines having magnets encased in magnetically permeable material configured to conduct magnetic flux of the rotor. IPM motors have become popular due to their high power density, wide speed range, and high efficiency performance. Current trends demonstrate that IPMs are increasing in efficiency as synchronous motors due to advances in high-energy permanent magnet technology, smart inverters, and digital controllers. Each magnetic pole on the rotor is conventionally created by putting permanent magnet material into slots formed in a laminated stack of the rotor. Such slots are typically not completely filled with magnetic material, instead being designed to hold a magnet in the center with voids or non-magnetic material at two opposite ends of the slot. A nested v-shaped slot configuration is known from U.S. Pat. Nos. 7,851,958, 7,459,821, and 10,211,690.

Despite their many benefits, IPM machines face continuing challenges that are particularly relevant in the light, small, and medium electric vehicle applications, including highly volatile fluctuations in magnet price, primarily due to similar issues applicable to raw heavy rare-earth materials. In addition, as these materials are heavily concentrated in particular geographic regions, the supply chain can be particularly unstable, resulting in various national concerns. Recent trends and developments in rotating machinery have therefore increasingly focused on reducing rare-earth material content in an effort to stabilize both product cost and supply chain pipelines. Another challenge with IPM machines is that increasing magnet content for peak torque operation has multiple detrimental effects on other machine performance metrics, particularly in the low-torque regions, which is particularly relevant in the aforementioned electric vehicle applications. IPM machines generally have a profound issue with maintaining high efficiencies in the low-torque regions, primarily due to the presence of the magnets resulting in "core loss", defined as the losses due to magnetic hysteresis and eddy-currents, induced due to the presence of a changing magnetic flux in the magnetically permeable steel of the stator body and of the rotor body. IPM machines carry a significant amount of flux due to the magnets even at low or zero current conditions, drastically reducing efficiencies in the low-torque regions. Increasing magnet content in IPM machines generally results in significantly higher cogging torque and torque ripple, resulting in increased noise, vibrations, and harmonics. As a percentage of the output torque, the cogging torque can be significant in low-torque conditions, increasing mechanical wear and injecting current harmonics in the remaining system. In commercial IPM machines, these effects are typically mitigated by axially segmenting and "skewing" the rotor, with each segment slightly angularly displaced, resulting in reduced peak torque output from the machine.

A typical approach to power generation includes use of a low-cost wound rotor synchronous machine (WRSM), a field-wound machine containing a rotor field winding, which can be used for voltage regulation. The same machine may be used as a motor, containing increased flexibility associated to the rotor winding which may be used to regulate output torque. Another type of machine, used either for power generation or as a motor, is the surface-mounted permanent magnet synchronous machine (SM-PMSM), which typically offers lower loss and higher power densities, but at a higher material cost. Hybrid machines, containing both magnets and a field winding, typically offer an intermediate solution, improving efficiency and lowering material cost while offering greater control flexibility. Several configurations for hybrid machines are known from U.S. Pat. Nos. 9,780,715 B2, 5,663,605, 5,753,989, and U.S. Pat. No. 2014/0077654 A1.

Current known hybrid machines can suffer from several limitations. Their maximum speeds are typically limited due to the mechanical challenges of magnet retention at high rotor speeds. They provide limited opportunities for saliency due to the rotor steel and magnets competing for circumferential space, particularly as compared to IPM machines, wherein the rotor steel and magnets compete primarily for radial space. The stator flux linkage due to the rotor tends to be limited due to magnets and rotor field windings competing for space to maximize this linkage on the same stator axis. Finally, torque production over a wide speed range suffers as the torque due to the magnet and rotor field winding are often associated to the same stator axis as that in which inductance is maximized for saliency torque, degrading performance in the "constant power" operating regions wherein the stator current is typically further moved from one axis to another. Finally, although typical hybrids can partially mitigate the rare-earth material cost issue, they may still require substantial amounts of magnets to reach the desired torque targets.

Pertaining to both IPMs and hybrids, any rotating machine utilizing a significant amount of magnets, typically being utilized to improve efficiency and increase power density, face the issue of being electrically limited in the speeds at which the maximum torque can no longer be maintained, known as the "base speed", consequently limiting the maximum power output of the motor. At the base speed, the voltage produced at the machine terminals, known as the "back-emf" reaches a limit imposed by the DC side of the power system. Typically, the peak power is obtained from the electric machine at a speed beyond the base speed, at the "peak power speed". Beyond the peak power speed, the increase in speed is not as significant compared to the decrease in maximum torque. Although IPMs better leverage the machine's saliency to mitigate this issue, the problem represents an ongoing and significant design challenge.

There is a need for electric machines with improved performance metrics (torque density, power density, efficiency, maximum speed) at a lower cost.

SUMMARY

Electric machines are presented herein having slots in magnetically permeable material of the rotor that are positioned to promote q-axis flux linkage due to the rotor. The slots preferably include two sets of separately driven field windings, i.e. rotor q-axis field windings configured to produce q-axis flux linkages due to the rotor and rotor d-axis field windings configured to produce d-axis flux linkage due to the rotor. By virtue of being positioned within the slots, some or all of the rotor q-axis field windings and the rotor d-axis field windings are encased in magnetically permeable material of the rotor configured to conduct magnetic flux (i.e. embedded in the rotor). In alternative configurations, some of the field windings are replaced with magnets in various combinations. When permanent magnets, rotor q-axis field windings, and rotor d-axis field windings are positioned in the slots, the magnets function as additional sources of interior rotor excitation. Such configurations can generally result in a wide-speed multiple interior rotor excitation machine (MIREM).

At least some of the example electric machines presented herein may be particularly suited to function as an electric motor in light, small, and medium electric vehicle applications. At least some of the example electric machines presented herein may provide cost savings in comparison to previous electric motors used in these applications by using inexpensive materials and well-understood manufacturing techniques. Additionally, or alternatively, at least some example electric machines presented herein may offer high efficiencies at low and continuous torque operating points, may be efficiently packaged by mass and volume, and/or may be capable of supplying short bursts of peak torques during motoring and/or regenerative braking over a wide speed range.

From electrical machine theory, steady-state voltage at machine terminals and torque generated by machine magnetomotive forces in an electrical machine result from the interaction of stator flux linkages (q-axis stator flux linkage and d-axis stator flux linkage) and stator currents (q-axis stator current and d-axis stator current). The q-axis stator flux linkage is a function of the q-axis flux linkage due to the stator, obtained as a product of the q-axis stator inductance and the q-axis stator current, plus a q-axis flux linkage due to the rotor. The d-axis stator flux linkage is a function of the d-axis flux linkage due to the stator, obtained as a product of the d-axis stator inductance and the d-axis stator current, plus a d-axis field flux linkage due to the rotor.

Typical known electrical machines are configured such that there is no q-axis flux linkage due to the rotor. In an IPM machine, the d-axis flux linkage due to the rotor is entirely comprised of a d-axis magnet flux linkage. For IPMs, the maximum torque per current amperage is typically obtained at a positive q-axis stator current and a negative d-axis stator current. Due to system voltage limitations, as the machine speed is increased above the base speed, the q-axis stator current is continuously reduced in magnitude while the d-axis stator current is continuously made more negative to maximize torque per amperage. The increasing magnitude of the d-axis stator current results in an increased component of torque due to machine saliency, producing higher torques over a wider speed range.

In a hybrid machine, the d-axis flux linkage due to the rotor is comprised of a d-axis magnet flux linkage and a d-axis rotor field flux linkage, which is a product of the d-axis rotor inductance and the d-axis rotor current. The maximum torque per current amperage is typically obtained at a positive q-axis stator current and a low positive or negative d-axis stator current. As the machine speed is increased above the base speed, the q-axis stator current is continuously reduced in magnitude while the d-axis stator current is continuously made more negative to maximize torque per amperage. However, while allowing for higher speeds, this action in hybrid machines reduces torque due to the magnets, the rotor d-axis field winding, and may reduce torque due to the machine saliency. Alternatively, higher speeds may be obtained by applying a negative current in the rotor d-axis field winding, which may not significantly affect torque due to machine saliency. However, this action reduces torque due to the magnets and the rotor d-axis field winding. It also requires additional amperage in the rotor field winding.

An example electric machine includes a magnetically permeable cylindrically shaped stator assembly and a rotor assembly extending longitudinally within the stator assembly and configured to rotate circumferentially within the stator assembly. The stator assembly includes stator windings formed about a plurality of stator teeth. The stator windings are configured to provide a magnetomotive force applicable on the rotor assembly. The rotor assembly includes a rotational drive mechanism coupled to a rotor body. The rotor body includes magnetically permeable material configured for conducting magnetic flux, and a plurality of rotor slot clusters, each rotor slot cluster including a plurality of rotor slots formed in the rotor body. The slots in each slot cluster extend longitudinally through the rotor body and are arranged in a nested semi-hexagonal slot pattern in a plane orthogonal to a longitudinal axis of the rotor. The nested semi-hexagonal slot pattern is symmetric about the d-axis. The nested semi-hexagonal slot pattern is bisected by a perimeter of the rotor body, meaning the semi-hexagonal slot pattern would be a complete hexagonal shape if a mirror image of the semi-hexagonal slot pattern were projected across the perimeter of the rotor body. The nested semi-hexagonal slot pattern includes a trapezoidal slot, a first semi-hexagonal slot pattern in which the trapezoidal slot is nested, and a second semi-hexagonal slot pattern in which the first semi-hexagonal slot pattern is nested. The trapezoidal slot is positioned adjacent the perimeter of the rotor. The d-axis of the rotor passes through a line of symmetry of trapezoidal slot. Each slot cluster further includes a tri-rectangular slot formed in the rotor body that is positioned between adjacent rotor slot clusters.

For each of the rotor slot clusters, the nested semi-hexagonal slot pattern defines a plurality of hexagonal branches formed in the magnetically permeable material of the rotor body. The branches include a first branch, a second branch in which the first branch is nested, and a third branch in which the second branch is nested. The first branch is bounded at least in part by the trapezoidal slot and the first semi-hexagonal slot pattern. The second branch is bounded at least in part by the first semi-hexagonal slot pattern and the second semi-hexagonal slot pattern. The third branch is bounded at least in part by the second semi-hexagonal slot pattern.

The rotor assembly further includes a plurality of rotor field conductors positioned within at least some of the rotor slots. For each of the plurality of slot clusters, the rotor assembly includes a rotor d-axis field winding extending through a first portion of slots in the nested semi-hexagonal slot pattern and a rotor q-axis field winding extending through a second portion of slots in the nested semi-hexagonal slot pattern. The rotor d-axis field winding is configured to carry current to produce magnetic flux aligned with the d-axis and stator d-axis winding. The rotor q-axis field winding is configured to carry current to produce magnetic flux aligned with the q-axis and stator q-axis winding. The rotor q-axis field winding and rotor d-axis field winding together generate a magnetomotive force applicable on the stator assembly and which together with the magnetomotive force generated by the stator assembly creates torque that causes rotation of the rotor assembly.

As used herein, electrical machine "architecture" refers to the particular number, types of shapes, placement, and arrangements, collectively the configuration of the plurality of rotor slots in each of the plurality of rotor slot clusters, the particular types of shapes, placement, and arrangements of the plurality of stator teeth, the particular placement and arrangement of the plurality of rotor conductors, and the particular placement and arrangement of the plurality of stator conductors, the particular types of shapes, placement, and arrangements of the plurality of magnets, and the particular types of shapes, placement, and arrangements of any other types of components.

As used herein, electrical machine "design" refers to the particular number of machine magnetic poles, the particular number, dimensions, and resulting shapes of the rotor components, including but not limited to plurality of rotor slot clusters, the plurality of rotor conductors, the plurality of magnets, the particular number, dimensions, and resulting shapes of the stator components, including but not limited to the plurality of stator teeth, the plurality of stator conductors, the stator insulation systems, the materials of the stator components, including but not limited to the material of the stator body, the material of the stator conductors, the material of the insulation systems, the materials of the rotor components, including but not limited to the material of the rotor body, the material of the rotor conductors, the material of the rotor insulation systems, and the material of the magnets, the material of the housing, as well as any other specific information of any other components in the electrical machine, including the materials, numbers, dimensions, resultant shapes, and positions, as well as the spatial relationships between all components, collectively affecting the orientation and positions of the features of the electrical machine architecture. In general, advantageous electrical machine architectures will yield a greater variety of electrical machine designs that meet the performance metrics required for a particular application, typically resulting in an optimality trade-off between competing performance metrics objectives, such as mass and efficiency. The electrical machine architecture presented herein will tend to yield a greater variety of electrical machine designs suitable for light, small, and medium electric vehicle applications.

An example electrical machine architecture is such that machine contains advantageous saliency features, wherein the d-axis stator inductance is significantly less than the q-axis stator inductance, the difference between the d-axis stator inductance and the q-axis stator inductance being proportional to the torque due to machine saliency when multiplied by the q-axis stator current and the d-axis stator current, being a negative value. The q-axis stator inductance and d-axis stator inductance, and therefore the torque due to machine saliency, are heavily related to the electrical machine architecture and electrical machine design. The shape of the tri-rectangular slot feature positioned between adjacent rotor slot clusters electrical machine architecture is configured to increase machine saliency, providing flux paths to maximize q-axis stator inductance while further reducing d-axis stator inductance.

Additionally, unlike typical IPM or synchronous reluctance (SR) machines, due to reduced magnet content and the structural support properties of the rotor q-axis field winding and the rotor d-axis field winding, an increased number or rotor slots can be used in each rotor slot cluster, in addition to significantly smaller mechanical bridges that are required in the rotor, which are used to assist with both magnet retention and rotor body structural integrity but which also increase flux leakage in the machine such that less flux from the rotor links with the stator windings.

Unique to the present disclosure, the rotor is configured to include a rotor q-axis field winding that is aligned with the stator q-axis winding and results in q-axis flux linkage due to the rotor and a rotor d-axis field winding that is aligned with the stator q-axis winding and results in d-axis flux linkage due to the rotor. The q-axis flux linkage due to the rotor includes a q-axis rotor field flux linkage, which is a product of the q-axis rotor inductance and the q-axis rotor current. The d-axis flux linkage due to the rotor includes a d-axis rotor field flux linkage, which is a product of the d-axis rotor inductance and the d-axis rotor current. As with the q-axis stator inductance, the q-axis rotor inductance is significantly greater than the d-axis rotor inductance, resulting in the torque per unit current due to rotor q-axis field winding being significantly greater than the torque per unit current due to rotor d-axis field winding. In typical optimal examples of electrical machine designs for the electrical machine architecture, as the q-axis stator current is reduced and the d-axis stator current is made more negative while the machine speed is increased, the decrease in torque due to rotor d-axis field winding, which is proportional to the product of the d-axis rotor inductance, the d-axis rotor current, and the q-axis stator current, may be offset by the increase in torque due to rotor q-axis field winding, which is proportional to the product of the q-axis rotor inductance, the q-axis rotor current, and the d-axis stator current. Consequently, the electrical machine architecture offers significant benefits with improved peak torque production capability over a wide speed range.

The electrical machine architecture is designed to service typical steady state continuous torque demands primarily through saliency, with the rotor q-axis field winding and rotor d-axis field winding being used for peak torque acceleration and regenerative braking operating points. As a result, electrical machine architecture is capable of high efficiency during low continuous torque conditions, has the functionality to produce high peak torques, and is able to utilize the rotor q-axis field winding to produce the peak torques over a wide speed range, resulting in overall higher peak power densities.

In another example electric machine, some of both the rotor q-axis field winding and rotor d-axis field winding are replaced by magnets producing flux aligned with the stator d-axis winding, contributing to d-axis flux linkage due to the rotor, while reducing the q-axis rotor field flux linkage and the d-axis rotor field flux linkage.

In another example electric machine, some or all of the rotor d-axis field winding is replaced by magnets producing flux aligned with the stator d-axis winding, contributing to d-axis flux linkage due to the rotor, while reducing or removing the d-axis rotor field flux linkage.

In another example electric machine, some or all of the rotor q-axis field winding is replaced by magnets producing flux aligned with the stator d-axis winding, contributing to d-axis flux linkage due to the rotor, while reducing the q-axis rotor field flux linkage.

The aforementioned embodiments provide additional design choices for some applications, where typical operating points may require higher continuous torques and higher additional peak torques for provided machine size and mass limitations. Such embodiments may be used to increase efficiency at higher torque operating points by sacrificing efficiency at low torque points. As a result, they may also reduce overall design mass and volume, while still maintaining a wide speed range due to machine saliency and, if available, the rotor q-axis field winding.

In some example electric machines, the machine structural support members may be comprised of additively manufactured (AM) materials containing embedded cooling channels. Structural support members produced using AM are expected to significantly reduce the machine mass, while the embedded cooling channels are expected to significantly improve the thermal performance of the machine.

In some example electric machines, a continuous bar winding may be used to further enable high-volume manufacturing and reduce cost.

In some example electric machines, bonded cores may be used to further enable high-volume manufacturing and reduce cost.

An example energy conversion system includes a mechanical load or prime mover, an electrical machine, a power converter, and a controller. The system may include a gearbox between the load/mover and the electrical machine. The electrical machine is a multiple interior rotor excitation machine having a rotor d-axis field winding and a rotor q-axis rotor winding. The electric machine may also include permanent magnets in the rotor. The power converter includes terminals connected to the rotor d-axis field windings and the rotor q-axis field windings. The converter independently provides and/or receives current to/from the rotor d-axis field winding and the rotor q-axis field winding. The power converter is also connected to electrical terminals of the electric machine to stator windings. The system is configured to i) provide electrical power in a power generation mode, and/or ii) provide mechanical power in a motoring mode. The electrical power source or load is configured to i) receive electrical power in power generation mode, and/or ii) provide electrical power in a motoring mode. The controller is configured to issue control signals to the power converter and receive various system measurements from a collection of measurement sensors.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. Like numerals indicate like structural elements and features in the various figures.

DETAILED DESCRIPTION

Figure 1:
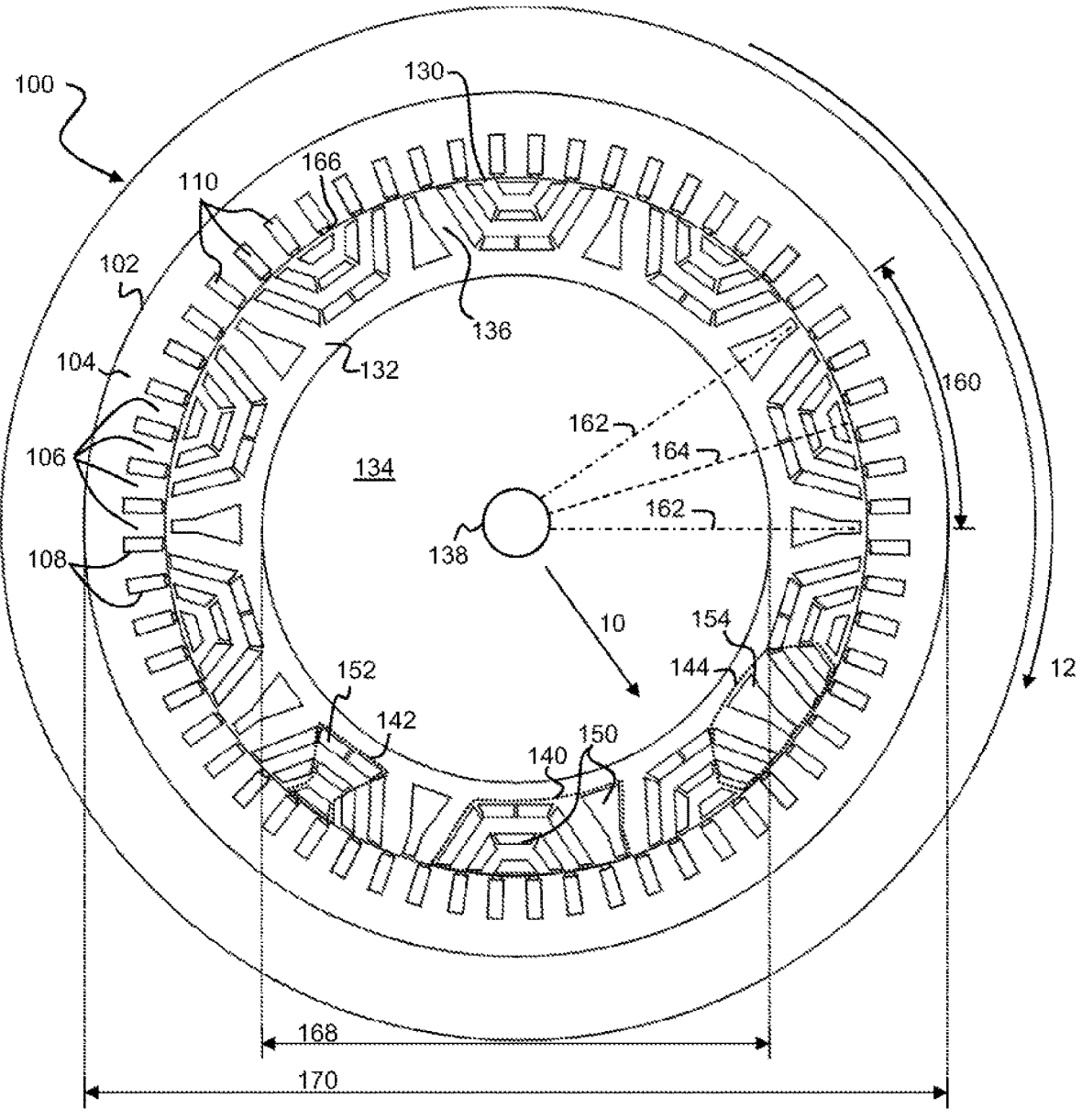
FIG. 1 is a cross sectional view of a first example electric machine according to aspects of the present invention.

Unless specifically stated otherwise, or apparent in context, it is to be understood that "motor", "generator", and "machine" are used interchangeably to refer to a rotating electric machine.

In general, this disclosure is related to an electrical machine architecture, which can result in improved machine performance metrics as generally compared to known machines, including increased peak torque density, a wide speed range, reduced cost, and lower loss, particularly in the low-torque regions. To enable the improvements in these performance metrics the electrical machine architecture also results in increased machine saliency and increased operational flexibility in the machine excitation sources.

Some aspects of the present disclosure relate to changes in the configuration of rotor excitation sources. To aid in the discussion of these changes in configuration of rotor excitation sources, various known electric machines and their rotor configurations are discussed as a basis for comparison for aspects of the present invention.

As one basis for comparison, IPM and SM-PMSM machines contain magnets that produce flux aligned with the stator d-axis winding. WRSM machines contain a rotor d-axis field winding that produces flux aligned with the stator d-axis winding. Hybrid machines contain both magnets and a rotor d-axis field winding that produce flux aligned with the stator d-axis winding. A key challenge in all electrical machines is enabling increased torque capability over a wide speed range, particularly beyond the base speed. Several approaches have previously been devised to improve the torque capability, each of which results in reduced performance metrics in the other operating regions of the machines. One approach, used in machines containing magnets, is "field weakening", wherein the stator current is shifted from stator q-axis axis winding to the stator d-axis axis winding specifically to oppose the field due to magnets, which is a significant component of the terminal voltage. While enabling higher speeds, this approach either dramatically reduces peak torque as speeds increase, as for example in the reduced saliency SM-PMSM and hybrid machines, or it reduces the peak torque slightly more moderately, as for example in the higher saliency IPM machines.

As another basis for comparison, hybrid machines containing a rotor d-axis field winding may use this winding for field weakening. While improving the torque capability, the approach requires a significant amount of current or number of conductor turns to be effective, increasing machine size or losses in the rotor assembly, wherefrom heat removal is significantly more difficult, resulting in an overall thermal management problem. In addition, either the complexity of the system is increased due to requiring bi-directional d-axis rotor current capability, or the capability of the machine is reduced by allowing the current to only oppose magnet flux.

As another basis for comparison, in machines without magnets, such as WRSM machines, the terminal voltage may be reduced by a combination of reducing the d-axis rotor current and negatively increasing the d-axis stator current. However, these machines typically tend to require more mass and result in higher losses overall, particularly for the nominal operating conditions. They are also somewhat limited in their saliency compared to IPM machines, resulting in limited torque due to saliency as stator current is shifted between the axes.

Some aspects of the rotor body architecture of the present disclosure relate to changes in the configuration of the rotor slots in each of the plurality of rotor slot clusters. Similar to IPM and SR machines, the rotor body architecture, which includes the configuration of the plurality of rotor slot clusters, is a critical challenge for developing an electric machine that will meet identified performance targets. Utilization of magnetic materials within limited space of the machine can affect performance. An aim of example rotor body architectures presented herein is increased saliency, such that the inductance in one stator winding axis is significantly greater than the inductance in the other stator winding axis, increasing torque over a wide speed range as the stator current is shifted between the axes. Other considerations taken into account for the example rotor body architectures presented herein are centrifugal forces and mechanical stresses encountered during maximum speed rotation, which are highly affected by the changes in structural integrity of the rotor body due to changes in the configuration of the rotor slots in each of the plurality of rotor slot clusters.

There are many complex mechanical, electro-magnetic and thermal design issues relating to design of a wide-speed, high-power-density electric machines containing interior rotor slots, or cavities in the rotor body. In many instances a change to the design one machine component both produces a benefit in one area of machine performance and has negative repercussions for other areas of machine performance. For instance, at high speeds, rotor structural integrity and mechanical balance are critical design issues. In particular, the structural integrity should be considered in the sizing of the rotor bridges (material positioned over a perimeter of a rotor body to structurally hold permanent magnets and/or field windings to the rotor body), to provide sufficient structural support internal to the rotor body. On the other hand, the rotor bridges must be thin enough to operate in a saturated state, even at low current conditions, or a significant percentage of the excitation source flux is wasted. As a result, dimensioning the rotor excitation sources with proper sizes and aspect ratios at load conditions and at the same time designing the rotor to operate at optimum flux density level is a complex design consideration.

Increasing the machine saliency is a primary concern to further enable torque capability over a wide speed range, particularly for machines containing interior rotor slots. A design goal of example electric machines and systems presented herein is to maximize the q-axis stator inductance and minimize the d-axis stator inductance. In at least some of the examples presented herein, for a given electric machine architecture, size, and packaging limit, this is accomplished in the design geometry by changes in the dimensions and parameters of the rotor slots and the adjacent rotor branches. Increasing the rotor slot depths, and thereby reducing the rotor branch depths, typically decreases both the q-axis stator inductance and the d-axis stator inductance. In addition, the angles and placements of the rotor slots also affect the stator inductances. As a result, dimensioning the parameters while balancing competing tradeoffs to maximize the saliency is a key consideration for the optimal machine design. Accordingly, attempts to improve the performance of machines containing interior rotor slots are typically associated with design of the rotor assembly and excitation source component size and placement such that it will result in improved performance. Further, light, small, and medium electric vehicles (LEV) traction motor applications tend to place restrictions on machine weight, size, source voltage, and maximum current, to name a few parameters. Thus, specific applications can place restrictions on changes to the various design parameters.

The electric machine architecture of at least some of the example electric machines presented herein is configured to complement these considerations by allowing for a greater number of designs that meet the target metrics. In one aspect of the disclosure, by removing or reducing the magnets in the architecture, the mechanical stress on the rotor bridges reduced, due to which the rotor bridges are not required to be as substantial in width. In addition, the rotor field windings have a certain amount of self-retention structural capability, further reducing the mechanical load on the rotor bridges and therefore allowing for further reduced rotor bridge widths. As a result, the rotor bridges can more easily be designed for magnetic considerations as opposed to mechanical considerations.

In another aspect of the disclosure, the addition and placement of a tri-rectangular slot in the electrical machine architecture, positioned between adjacent rotor slot clusters creates an added flux barrier to significantly reduce the d-axis stator inductance without significantly reducing the q-axis stator inductance, if designed appropriately. The addition of this type and placement of rotor slot may result in a prohibitive degradation of structural integrity, the rotor d-axis field winding embedded therein provides additional self-retention and support capability, increasing the structural integrity of the rotor assembly. Consequently, the changes in the electrical machine architecture allow for a greater number of design geometries that may result in machines with the required saliency, allowing for the desired performance metrics.

In another aspect of the present disclosure, the rotor assembly contains at least two rotor excitation sources, such that least one rotor excitation source, a rotor q-axis excitation source, is aligned with the stator q-axis winding and at least one rotor excitation source, a rotor d-axis excitation source, is aligned with the stator d-axis winding. A given rotor q-axis excitation source may include a rotor q-axis field winding, containing a number of turns to provide q-axis flux when energized with rotor current. A given rotor d-axis excitation source may include magnets and/or a rotor d-axis field winding, containing a number of turns to provide d-axis flux when energized with rotor current. The addition of the rotor q-axis excitation source in the electrical machine architecture may offer significant advantages in improving the torque capability over a wide speed range by imposing a rotor q-axis field in the electrical machine. In particular, as stator current is shifted from the stator q-axis winding to the stator d-axis winding, the additional d-axis stator current contributes not only to the torque due to saliency, but an additional torque component due to the rotor q-axis field. Furthermore, the electrical machine continues to produce torque from the q-axis stator current and the rotor d-axis field, imposed by any rotor d-axis excitation sources, including the magnets and/or rotor d-axis field windings.

In another aspect of the present disclosure, the rotor excitation sources, including the rotor q-axis field windings and the rotor d-axis field windings, as well as any magnets that may be used in some embodiments, are fully encased in the rotor slot clusters which are in the interior of the rotor body. Unlike known WRSM machines or hybrid machines, encasing the rotor windings in the rotor slot clusters allows for rotor field-wound machines with increased saliency due to the rotor slot behaving as flux barriers. In addition, as compared to hybrid machines, utilizing the interior rotor slots for the rotor excitation sources also allows for machines with significantly higher speed limits due to the increased mechanical retention capabilities.

I. Machine Models and Principles of Operation

The steady-state voltage at the machine terminals and the torque generated by the machine magnetomotive forces in an electrical machine can be modeled using the equations:

$$\lambda_{qs} = L_q i_{qs} + \lambda_{qr} \tag{1}$$

$$\lambda_{ds} = L_d i_{ds} + \lambda_{dr} \tag{2}$$

-continued $$v_s = \sqrt{(r_s i_{qs} + \omega_r \lambda_{qs})^2 + (r_s i_{ds} - \omega_r \lambda_{ds})^2} \tag{3}$$

$$T_e = \frac{3}{2} \frac{P}{2} \left[ \underbrace{(L_d - L_q) i_{qs} i_{ds}}_{\text{Machine Saliency}} - \underbrace{\lambda_{qr} i_{ds}}_{\text{Rotor q-field}} + \underbrace{\lambda_{dr} i_{qs}}_{\text{Rotor d-field}} \right] \tag{4}$$

where $\lambda_{qs}$ is the q-axis stator flux linkage, $\lambda_{ds}$ is the d-axis stator flux linkage, $i_{qs}$ is the q-axis stator current, $i_{ds}$ is the d-axis stator current, $\lambda_{qr}$ is the q-axis rotor flux linkage, is the d-axis rotor flux linkage, $L_q$ is the q-axis stator inductance, $L_d$ is the d-axis stator inductance, $r_s$ is the stator phase resistance, $\omega_r$ is the rotor angular velocity in electrical radians, $v_s$ is the stator phase voltage, P is the number or stator poles, and $T_e$ is the electromagnetic torque generated by the machine.

The electrical machines described in prior art are configured such that there is no q-axis flux linkage due to the rotor, $\lambda_{qr}$, which is set to zero in the models. In an IPM machine, the d-axis flux linkage due to the rotor, $\lambda_{dr}$, results entirely from the d-axis magnet flux linkage, $\lambda_m$, resulting due to the magnets in the rotor being aligned with the stator d-axis winding. The resulting torque equation for an IPM is:

$$T_e = \frac{3}{2} \frac{P}{2} \left[ \underbrace{(L_d - L_q) i_{qs} i_{ds}}_{\text{Machine Saliency}} + \underbrace{\lambda_m i_{qs}}_{\text{Magnet}} \right] \tag{5}$$

In a hybrid machine, the d-axis flux linkage due to the rotor, $\lambda_{dr}$, is a combination of the d-axis magnet flux linkage, $\lambda_m$, and the d-axis rotor field flux linkage, which is a product of the d-axis rotor inductance, $L_{dfd}$, and the d-axis rotor current, $i_{dfd}$. The resulting torque equation for a hybrid machine is:

$$T_e = \frac{3}{2} \frac{P}{2} \left[ \underbrace{(L_d - L_q) i_{qs} i_{ds}}_{\text{Machine Saliency}} + \underbrace{\lambda_m i_{qs}}_{\text{Magnet}} + \underbrace{L_{dfd} i_{dfd} i_{qs}}_{\substack{\text{Rotor d-axis} \\ \text{field winding}}} \right] \tag{6}$$

Figure 2:
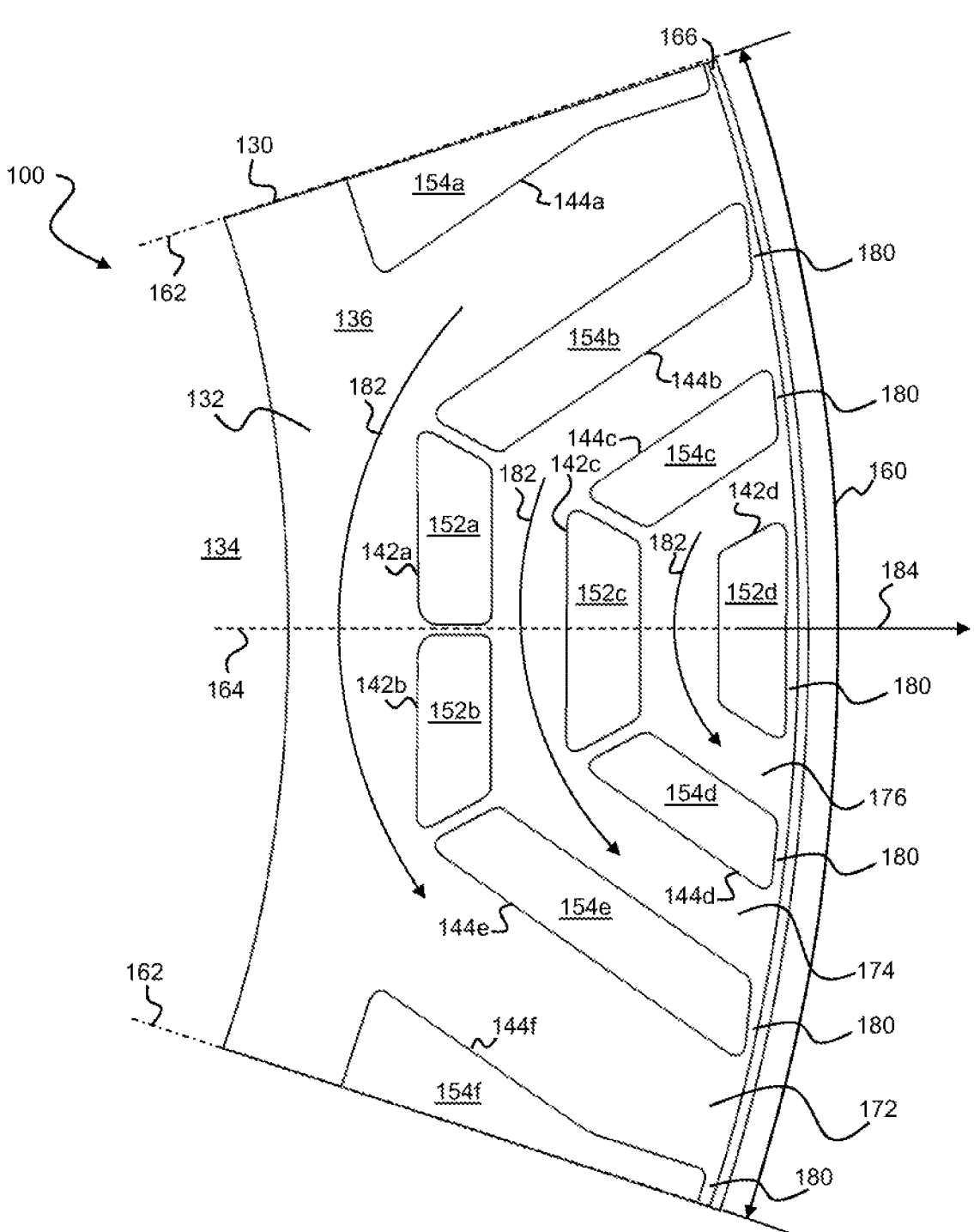
FIG. 2 is a cross sectional view of a pole of a rotor of the first example electric machine according to aspects of the present invention.
Figure 3:
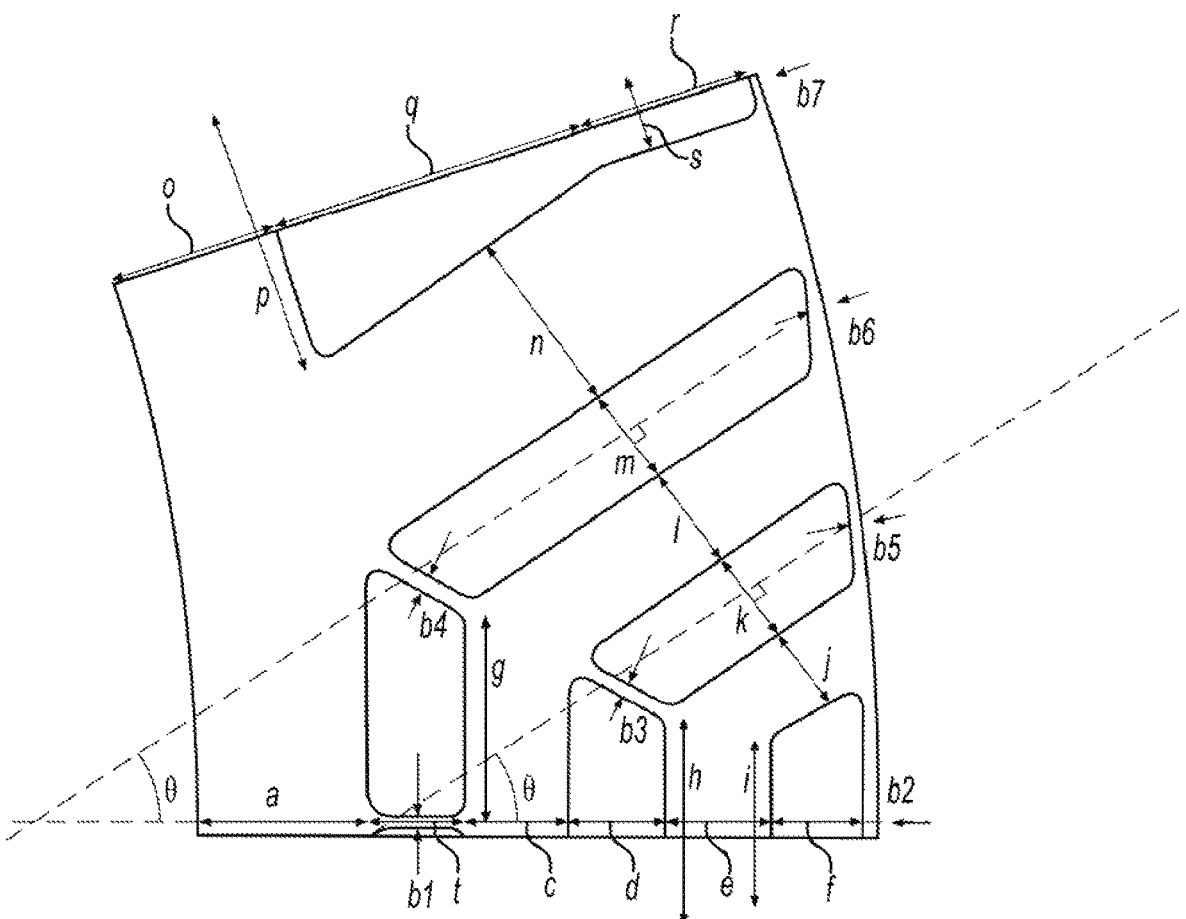
FIG. 3 is a cross sectional view of a half of the pole of the rotor illustrated in FIG. 2 and including dimensions according to aspects of the present invention.

In the example electric machines 100, 200, 300 presented in FIGS. 1-5, a q-axis flux linkage due to the rotor, $\lambda_{qr}$, exists due to the rotor q-axis field winding and is a product of the q-axis rotor inductance, $L_{qfd}$, and the q-axis rotor current, $i_{qfd}$. In addition, there is a d-axis flux linkage due to the rotor, which is a product of the d-axis rotor inductance, $L_{dfd}$, and the d-axis rotor current, $i_{dfd}$. Example electric machines 200, 300 presented in FIGS. 4 and 5 also include permanent magnets, resulting in torque due to magnets. The resulting general torque equation for such example electric machines 200, 300 is:

$$T_e = \frac{3}{2} \frac{P}{2} \left[ \underbrace{(L_d - L_q) i_{qs} i_{ds}}_{\text{Machine Saliency}} + \underbrace{\lambda_m i_{qs}}_{\text{Magnet}} + \underbrace{L_{dfd} i_{dfd} i_{qs}}_{\substack{\text{Rotor q-axis} \\ \text{field winding}}} + \underbrace{L_{dfd} i_{dfd} i_{qs}}_{\substack{\text{Rotor d-axis} \\ \text{field winding}}} \right] \tag{7}$$

where the magnet flux linkage, $\lambda_m$, is zero in the example electric machine 100 illustrated in FIGS. 1-3. The d-axis rotor inductance, $L_{dfd}$, may be reduced where magnets are used in place of rotor d-axis field winding segments, or zero in variations of the illustrated examples lacking a rotor d-axis field winding. Likewise, q-axis rotor inductance, $L_{qfd}$, may be reduced where magnets are used in place of q-axis rotor inductance, or zero in variations lacking a rotor q-axis field winding (i.e. electric machine 400 in FIG. 6).

As another basis for comparison to known machines, for IPMs the maximum torque per current amp is typically obtained at a positive q-axis stator current, $i_{qs}$, and a negative d-axis stator current, $i_{ds}$, and for hybrid machines a positive q-axis stator current, $i_{qs}$, and a low positive or negative d-axis stator current, $i_{ds}$. Due to system voltage limitations, speeds above the base speed may be obtained by continuously reducing the q-axis stator current, $i_{qs}$ in magnitude while making the d-axis stator current, $i_{ds}$, continuously more negative as the machine continues to increase in speed. In an IPM, the increasing magnitude of the d-axis stator current, $i_{ds}$, results in an increased component of torque due to machine saliency, which may be defined as the $L_q/L_d$ ratio, producing higher torques over a wider speed range. In a hybrid, while allowing for higher speeds, this action reduces torque due to magnets, the rotor d-axis field winding, and machine saliency. Alternatively, higher speeds may be obtained in a hybrid by injecting a negative current in the rotor d-axis field winding. However, this action reduces torque due to magnets and the rotor field winding and requires additional amperage in the rotor field winding.

In the electrical machine architecture of the present disclosure, negatively increasing the magnitude of the d-axis stator current, $i_{ds}$, results in an increased component of torque due to machine saliency, as well as an increased component of torque due to the rotor q-axis field winding. Furthermore, it is notable that, unique to the electrical machine architecture of the disclosure, at the maximum stator current angle, whereby the q-axis stator current is made to be zero and the d-axis stator current is made to be its maximum negative value, the machine may still produce significant torque due to the rotor q-axis field winding. This condition results in zero torque output from the machine in prior art.

II. Overview of Example Electric Machine Design

Turning now to the figures, FIG. 1 is an illustration of a cross sectional view of an example electric machine 100. The electric machine includes a stator assembly 102 and a rotor assembly 130.

The stator assembly 102 includes a stator backiron 104 while the rotor assembly 130 includes a rotor backiron 132.

The stator assembly 102 includes a plurality of stator teeth 106 protruded in a radial direction 10 inwardly (opposite illustrated arrow of radial direction 10) towards a longitudinal axis of the electric machine 100 (orthogonal to the page and coinciding with a shaft 138 through the rotor assembly 130). The stator teeth 106 are positioned at predetermined intervals represented by stator slots 108 along a circumferential direction 12. The stator assembly 102 includes one or more stator windings 110 that can be placed in the stator slots 108. The stator winding 110 is configured to provide a magnetomotive force (MMF) applicable on the rotor assembly 130.

A rotational drive mechanism, in this case the shaft 138, is positioned at the center of the rotor assembly 130 and is coupled to the rotor backiron 132 by an inert rotor material 134 and configured to rotate along with the rotor backiron 132. The rotor assembly 130 includes a magnetically permeable rotor body 136, a plurality of rotor field windings 150, and a plurality of rotor slot clusters 140. The rotor slot clusters 140 are placed apart from each other at an angular pole span 160. A d-axis 164 bisects each rotor slot cluster 140. The rotor slot clusters 140 are bounded by q-axes 162. The electric machine 100 includes ten poles and therefore ten rotor slot clusters 140. The number of poles can be varied as understood by a person skilled in the pertinent art.

The stator assembly 102 and the rotor assembly 130 are radially separated by an air gap 166. The machine 100 is constrained by an inner diameter 168 and the outer diameter 170, typically limited by packaging requirements.

The rotor field windings 150 include a rotor q-axis field winding 152 and a rotor d-axis field winding 154. Each rotor field winding 150 includes of a plurality of rotor field conductors that are positioned within slots of the slot clusters 140, where each slot can include a plurality of rotor field conductors. The slots 140 encase the field windings, meaning field conductors are within slots of the slot clusters 140 that completely surround the cross section of the field winding.

The slots in each slot cluster 140 extend longitudinally through the rotor body. The slot clusters 140 include a first portion of slots 142 that, in cross section, have an elongated shape that crosses the d-axis 164. The first portion of slots 142 includes the rotor q-axis field winding 152 therein. The rotor q-axis field winding 152 is configured to carry current to produce magnetic flux aligned with the q-axis 162 and thereby stator q-axis winding. The slot clusters include a second portion of slots 144 that include the rotor d-axis field winding 154 therein. The rotor d-axis winding 154 is configured to carry current to produce magnetic flux aligned with the d-axis 164 and thereby stator d-axis winding. The rotor q-axis field winding 152 and rotor d-axis field winding 154 together generate a magnetomotive force applicable on the stator assembly 102 and which together with the magnetomotive force generated by the stator assembly 102 creates torque that causes rotation of the rotor assembly 130.

FIG. 2 is a cross sectional view of a pole span 160 of the rotor assembly 130 of the electric machine 100 illustrated in FIG. 1. The embedded rotor slot geometry is configured to promote q-axis flux linkage due to the rotor. The embedded rotor slot geometry includes slots 142a-d, 144a-f that form branches 172, 174, 176 in the magnetically permeable rotor body 136 that curve in a direction 182 of q-axis flux. For each pole of the rotor assembly 130, the embedded rotor slot geometry generally forms two branches 176, 174 between slots that each have a shape resembling three sides of an equilateral hexagon, where two of the three sides terminate at an outer surface of the rotor body 136 and the third side is approximately parallel to the outer surface of the rotor body 136. The rotor slot geometry can include a third, inner branch 172, bounded in part by slots 144a, 144b, 142a, 142b, 144f and in part by interior inert rotor material 134. Slots 144b-e, angled in relation to the outer surface of the rotor body 136 and the trapezoidal slot 142d define the sides of the branches 172, 174, 176 which terminate at the outer surface of the rotor body 136. The angled slots 144b-e include rotor d-axis field conductors 154b-e of the rotor d-axis field winding. Magnetic flux produced by current through the rotor d-axis field winding 154 can be in a direction 184, generally traverse to the third, parallel side of the branches 172, 174, 176.

The third, parallel sides of the branches 172, 174, 176 are generally traverse to the d-axes 164. Slots 142a-d approximately parallel to the outer surface of the rotor body 136 define the third, parallel sides of the branches 172, 174, 176. These parallel slots 142a-d can have rotor q-axis field conductors 152a-d of the rotor q-axis field winding 152 positioned therein that are configured cause a q-axis flux linkage due to the rotor. The rotor q-axis windings can be configured to produce a q-axis flux that follows the curved paths 182 of the rotor branches. Direction 182 of rotation of q-axis flux can alternate between poles of the rotor so that q-axis flux from adjacent poles is additive along the q-axes 162.

As viewed in cross section in a plane orthogonal to the longitudinal axis of the rotor, the slot clusters 140 include a nested semi-hexagonal slot pattern symmetrical about the d-axis 164 and tri-rectangular slots 144a, 144f symmetrical about the q-axis 162. The nested semi-hexagonal slot pattern forms a hexagonal shape that is bisected by a perimeter of the rotor body 136, meaning if the nested semi-hexagonal slot pattern were mirrored across the perimeter of the rotor body, the resulting shape would be a hexagonal pattern. The nested semi-hexagonal slot pattern includes a trapezoidal slot 142d, a first semi-hexagonal slot pattern in which the trapezoidal slot 142d is nested, and a second semi-hexagonal slot pattern in which the first semi-hexagonal slot pattern is nested. The trapezoidal slot 142d is positioned adjacent the perimeter of the rotor body 136. The d-axis 164 passes through a line of symmetry of trapezoidal slot 142d. The first semi-hexagonal slot pattern includes two angled slots 144c, 144d and a parallel slot 142c. The second semi-hexagonal slot pattern includes two angled slots 144b, 144e and two parallel slots 142a, 142b.

For each of the rotor slot clusters 140, the nested semi-hexagonal slot pattern defines a plurality of hexagonal branches 172, 174, 176 formed in the magnetically permeable material of the rotor body 136. The branches include a first branch 176, a second branch 174 in which the first branch 176 is nested, and a third branch 172 in which the second branch 174 is nested. The first branch 176 is bounded at least in part by the trapezoidal slot 142d and slots 144c, 144d, 142c of the first semi-hexagonal slot pattern. The second branch 174 is bounded at least in part by slots of the first semi-hexagonal slot pattern and slots 142a, 142b, 144b, 144e of the second semi-hexagonal slot pattern. The third branch 172 is bounded at least in part by slots of the second semi-hexagonal slot pattern and the tri-rectangular slots 144a, 144f.

For each of the plurality of rotor slot clusters 140, rotor d-axis field conductors 154a-f of the rotor d-axis field winding 154 extend through a first portion of slots, including the angled slots 144b-e, in the nested semi-hexagonal slot pattern and rotor q-axis field conductors 152a-d of the rotor q-axis field winding 152 extend through a second portion of slots, including the parallel slots 142a-d, in the nested semi-hexagonal slot pattern. The rotor d-axis field winding 154 is configured to carry current to produce magnetic flux aligned with the d-axis 164 and stator d-axis winding. The rotor q-axis field winding 152 is configured to carry current to produce magnetic flux aligned with the q-axis 162 and stator q-axis winding. The rotor q-axis field winding 152 and rotor d-axis field winding 154 together generate a magnetomotive force applicable on the stator assembly 102 and which together with the magnetomotive force generated by the stator assembly 102 creates torque that causes rotation of the rotor assembly 130.

The rotor body 136 includes bridges 180 at the perimeter of the rotor body extending across slots 152d, 154a-f positioned near the perimeter. The bridges 180 provide structural support for windings or magnets within said slots 152, 154a-f.

FIG. 3 is a cross sectional view of half of the pole of the rotor assembly 130 illustrated in FIG. 2. The example electric machine design may contain an independent set of design geometry, material, and winding parameters, wherefrom all remaining dependent machine parameters may be calculated. An example set of rotor design geometry parameters may include a first bridge width b1, a second bridge width b2, a third bridge width b3, a fourth bridge width b4, a fifth bridge width b5, a sixth bridge width b6, a seventh bridge width b7, a direct rotor backiron depth a, a rotor slot angle θ, a second semi-hexagonal radial slot depth t, a radial second branch depth c, a first semi-hexagonal radial slot depth d, a radial first branch depth e, a single trapezoidal slot depth f, a second semi-hexagonal base slot width g, a first semi-hexagonal base slot width h, a single trapezoidal base slot width i, an angular first branch depth j, a first semi-hexagonal angular slot depth k, an angular second branch depth 1, a second semi-hexagonal angular slot depth m, an average angular third rotor branch depth n, a quadrature rotor backiron depth o, a tri-rectangular slot base width p, a tri-rectangular base depth q, a tri-rectangular slot tip width s, and a tri-rectangular slot tip depth r. A similar set of independent geometry parameters may be established for the stator. Parameterizing the electrical machine design allows rigorous optimization studies to be conducted and a large design space to be evaluated. An improved electrical machine architecture, such as that of the present disclosure, is expected to result in a greater number of designs that meet the performance metrics and requirements for the target application, with each design associated to a specific set of independent design parameters. Variations understood by a person skilled in the pertinent art are included in the present disclosure.

Figure 4:
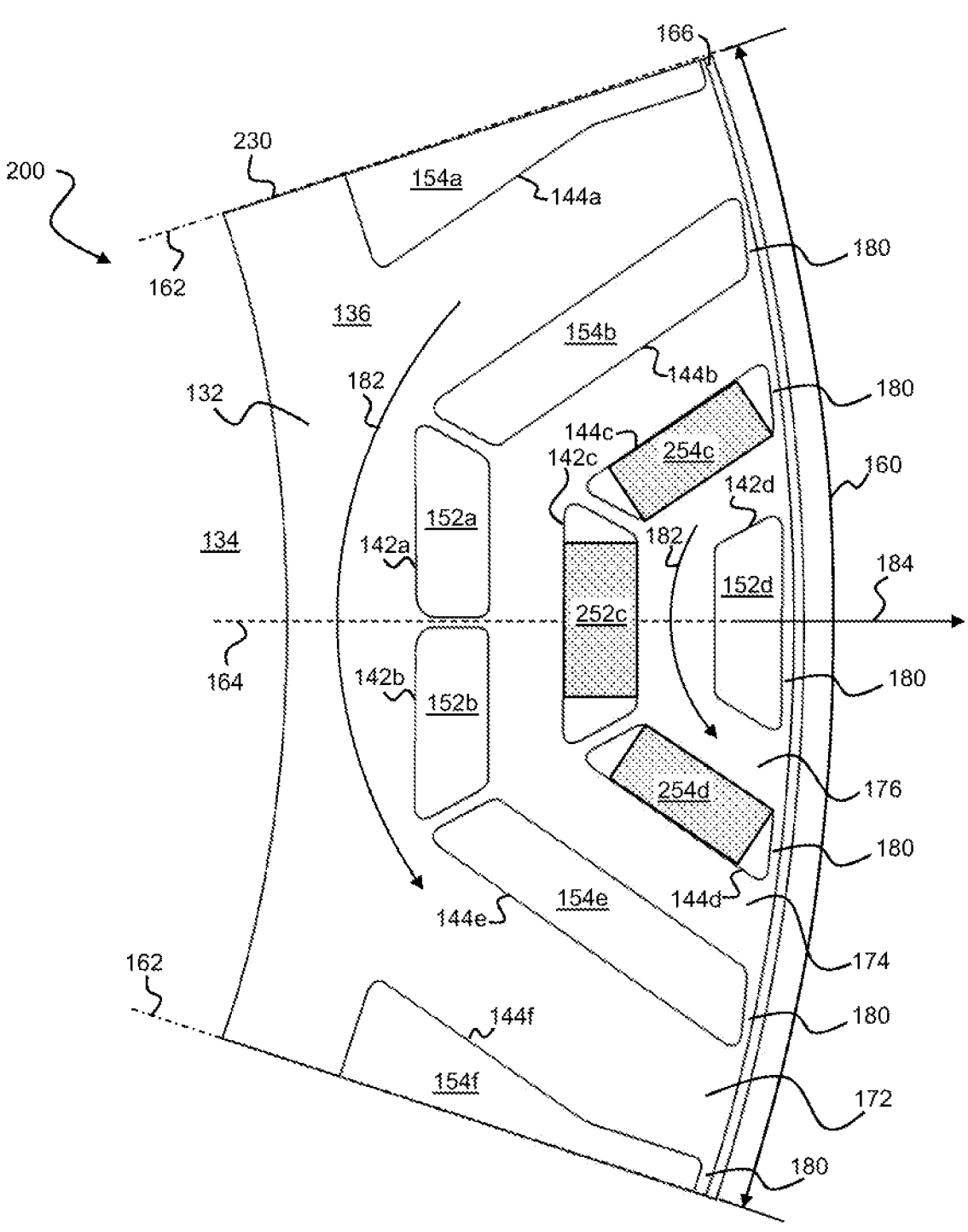
FIG. 4 is a cross sectional view of a pole of a rotor of a second example electric machine according to aspects of the present invention.

FIG. 4 is a cross sectional view of a pole of a rotor assembly 230 of a second example electric machine 200. Compared to the first example rotor assembly 130 illustrated in FIGS. 1-3, some of the field conductors of both the rotor q-axis field winding 152 and the rotor d-axis field winding 154 are replaced with magnets 252c, 254c, 254d. The second example electric machine 200 is otherwise configured similarly to the first example electric machine 100. Slots 142c, 144c, 144d of the first semi-hexagonal slot pattern have permanent magnets 252c, 254c, 254d extending therethrough. The magnets 252c, 254c, 254d are positioned to provide flux aligned with the d-axis 164. The illustrated example configuration and similar variations thereof may be advantageous in applications that require higher efficiencies in the medium torque regions over a wide speed range.

Figure 5:
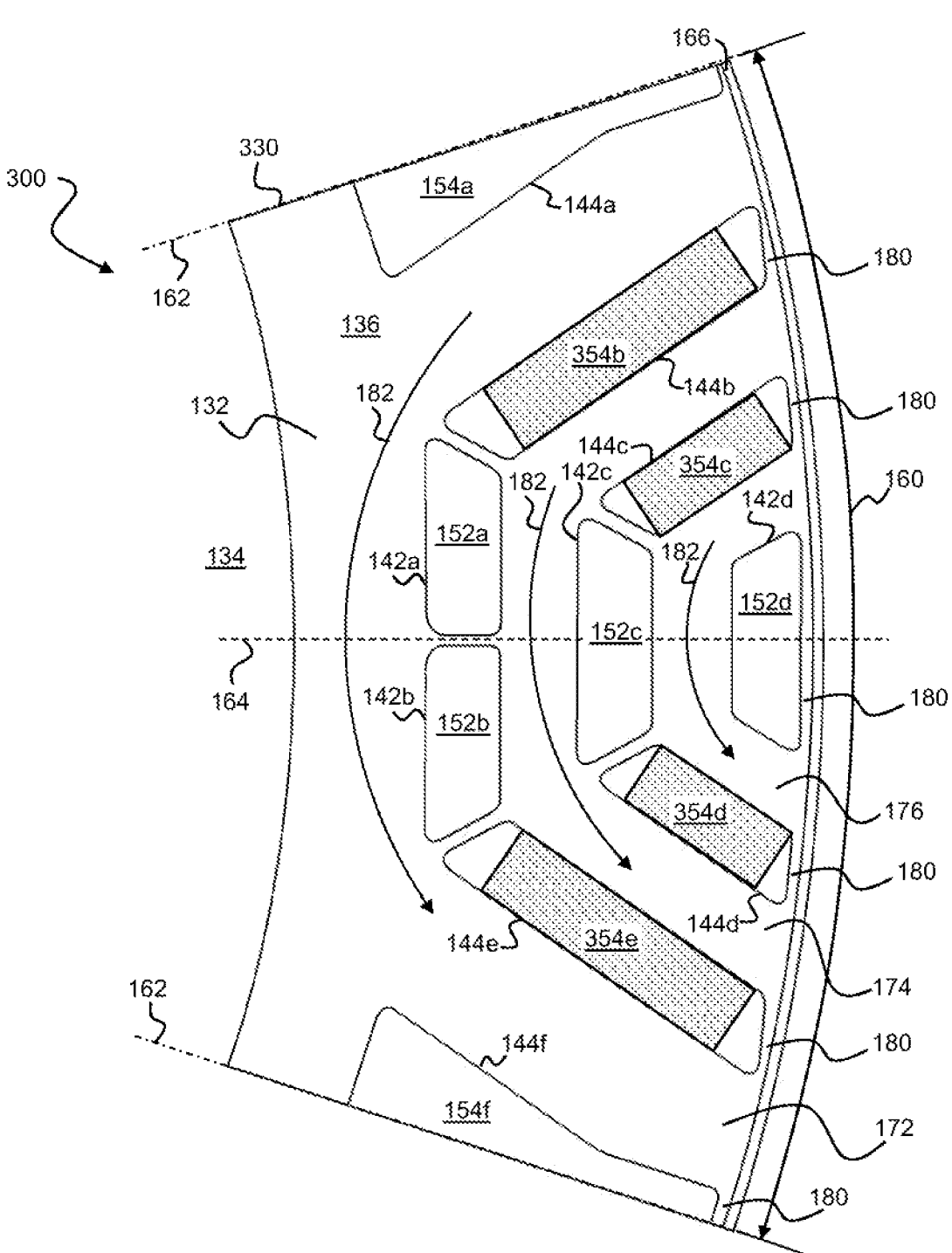
FIG. 5 is a cross sectional view of a pole of a rotor of a third example electric machine according to aspects of the present invention.

FIG. 5 is a cross sectional view of a pole of a rotor assembly 330 of a third example electric machine 300. Compared the first example rotor assembly 130 illustrated in FIGS. 1-3, field conductors of the rotor d-axis field winding 154 within the nested semi-hexagonal slot configuration are replaced with magnets 354b-e. The third example electric machine 300 is otherwise configured similarly to the first example electric machine 100. Angled slots 144b-e of the nested semi-hexagonal slot pattern have magnets 254b-e extending therethrough. The magnets 254b-e are positioned to provide flux aligned with the d-axis 164. The third example rotor assembly 330 includes rotor d-axis field conductors 154a, 154f of the rotor d-axis field winding 154 through the tri-rectangular slots 144a, 144f which are configured to provide magnetic flux along the d-axis 164. The illustrated example configuration and similar variations thereof may be advantageous in applications that require higher peak torques and higher efficiencies in the medium torque regions over a wide speed range.

Figure 6:
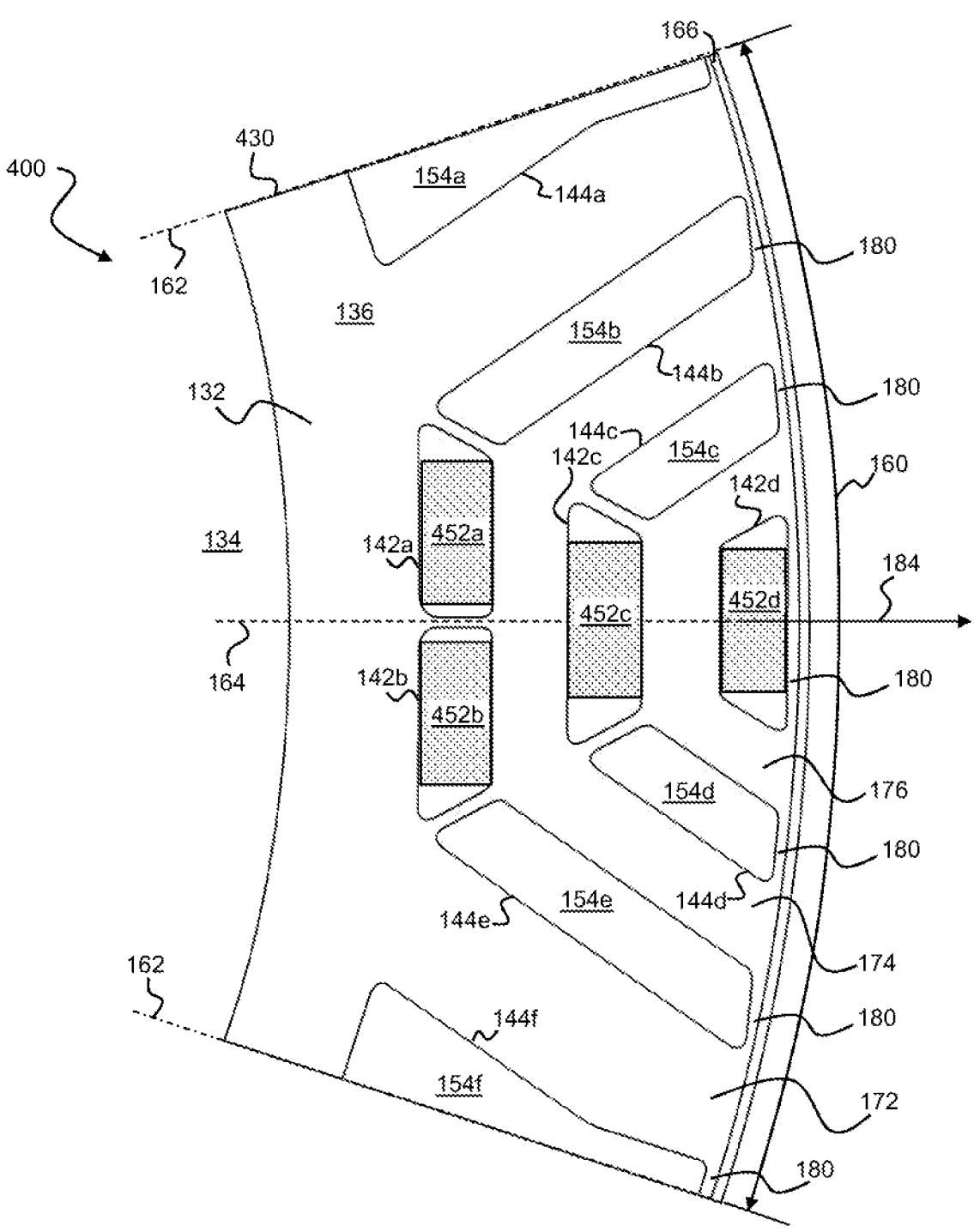
FIG. 6 is a cross sectional view of a pole of a rotor of a fourth example electric machine according to aspects of the present invention.

FIG. 6 is a cross sectional view of a pole of a rotor assembly 430 of a fourth example electric machine 400. Compared to the first example rotor assembly 130 illustrated in FIGS. 1-3, field conductors of the rotor q-axis field winding 152 are replaced with magnets 452*a-d*. The fourth electric machine 400 therefore lacks the rotor q-axis field winding 152 and the rotor is driven by the magnets 452*a-d* and the rotor d-axis field winding 154. The magnets 252*a-d* are positioned to provide flux aligned with the d-axis 164. The illustrated example configuration and similar variations thereof may be advantageous in applications that require high peak torques and higher efficiencies in the medium torque regions, wherein reducing the wide-speed torque capability is acceptable. In one such variation, at least one of the parallel slots 142*a-d* can include a rotor q-axis field conductor, in which case the variation of the fourth example electric machine 400 can include both rotor d-axis field winding 154 and rotor q-axis field winding 152 as in the other illustrated example electric machines 100, 200, 300, 400.

III. Overview of Performance Examples

Figures 7, 8:
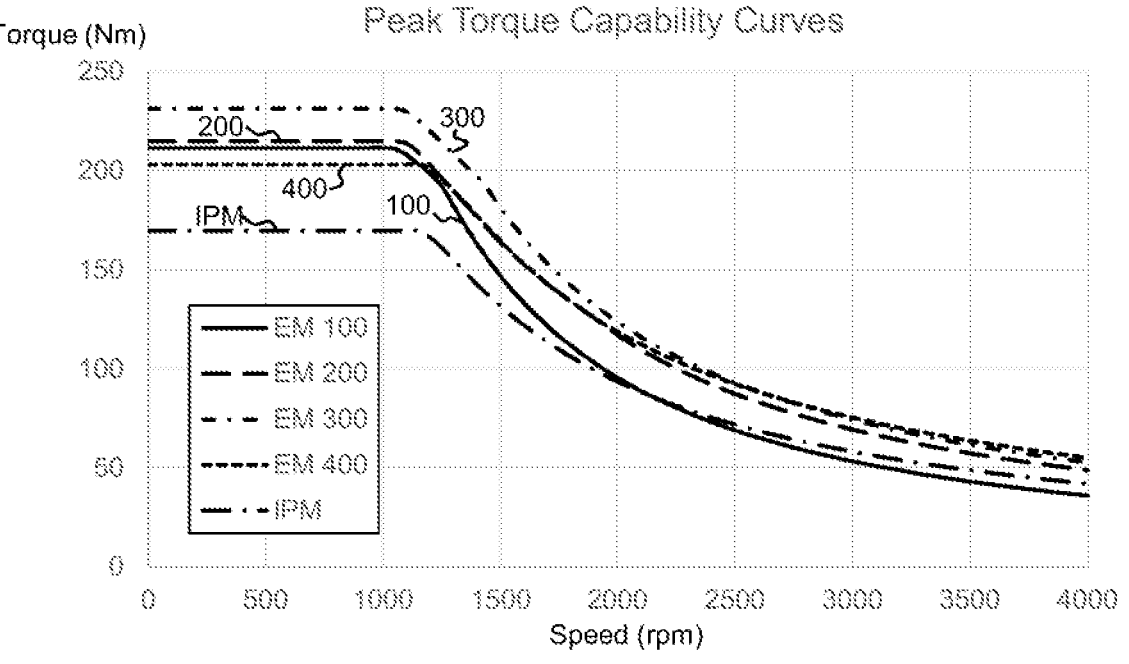
FIG. 7 is a graph including peak torque capability curves for the first, second, third, and fourth example electrical machines and a reference IPM according to aspects of the present invention.
FIG. 8 is a graph including low torque efficiency curves for the first, second, third, and fourth example electrical machines and a reference IPM according to aspects of the present invention.

FIGS. 7 and 8 illustrate example performance charts of the four example electric machines 100, 200, 300, 400 illustrated in FIGS. 1-6 and a known IPM electric machine architecture (as a basis of comparison), each operating as a motor.

FIG. 7 illustrates peak torque-speed characteristics of the motors as a function of torque in Newton-meters (Nm) with respect to speed in rotations per minute (RPM). As shown, at 0 RPM, the IPM machine has a peak torque of 169.7 Nm. At 0 RPM, the example electrical machines 100, 200, 300, 400 illustrated herein have peak torque values of 211.6 Nm, 214.8 Nm, 231.3 Nm, and 203.2 Nm, respectively. At their respective peak power speeds, the IPM machine has a peak power of 21.1 kW, the first, second, and fourth example electrical machines 100, 200, 400, illustrated in FIGS. 2, 4, and 6 respectively, have similar peak powers of around 25.5 kW, and the fourth example electrical machine 400 illustrated in FIG. 6 has a peak power of 28.9 kW.

In general, short bursts of increased peak torques may be more readily achieved by the electrical machine architecture of the present disclosure, primarily due to the ability to allow for over-current conditions in the rotor field windings that can temporarily but significantly increase rotor flux. Although the action results in increased losses, such high acceleration/deceleration events are sufficiently infrequent in electric vehicle applications that the overall drive cycle efficiency is not significantly affected. Additionally, the increased torques may be more readily maintained over the speed range, resulting in increased peak powers by the machines of the present disclosure.

FIG. 8 illustrates low-torque efficiency characteristics of the motors as a function of torque (Nm) with respect to speed (RPM). Furthermore, the maximum efficiency values at low-torque conditions for the example electrical machines 100, 200, 300, 400, and of the reference IPM machine are 96.6%, 98.3%, 98.6%, 98.5%, and 98.6%, respectively. As shown, the motor of the reference IPM machine results in the highest efficiency value, but with an efficiency characteristic that degrades significantly over the speed range, primarily due to core losses attributed to the increased magnet content therein. The first example electric machine 100 (FIG. 2) results in the lowest maximum efficiency value, although still at an acceptable level of 96.6%, with an efficiency characteristic that is maintained effectively over the speed range. The remaining example electrical machines 200, 300, 400 (FIGS. 4-6) result in maximum efficiency values that are comparable to that of the reference IPM machine, with efficiency characteristics that are generally between that of the reference IPM machine and the first example electrical machine 100 (FIG. 2) over the illustrated speed range.

At such low-torque regions, required torque can readily be serviced by the torque due to the machine saliency, resulting in the rotor field winding currents typically being zero. Without magnets, the first example electric machine 100 (FIG. 2) can maintain a comparatively high efficiency, as it is not penalized for core losses due to the magnets, which are not needed to meet the low-torque conditions. On the other hand, the reference IPM machine contains a significant number of magnets, resulting in significantly higher losses and reduced efficiency.

IV. Overview of Example Drive Systems Implementing MIREMs

Figure 9:
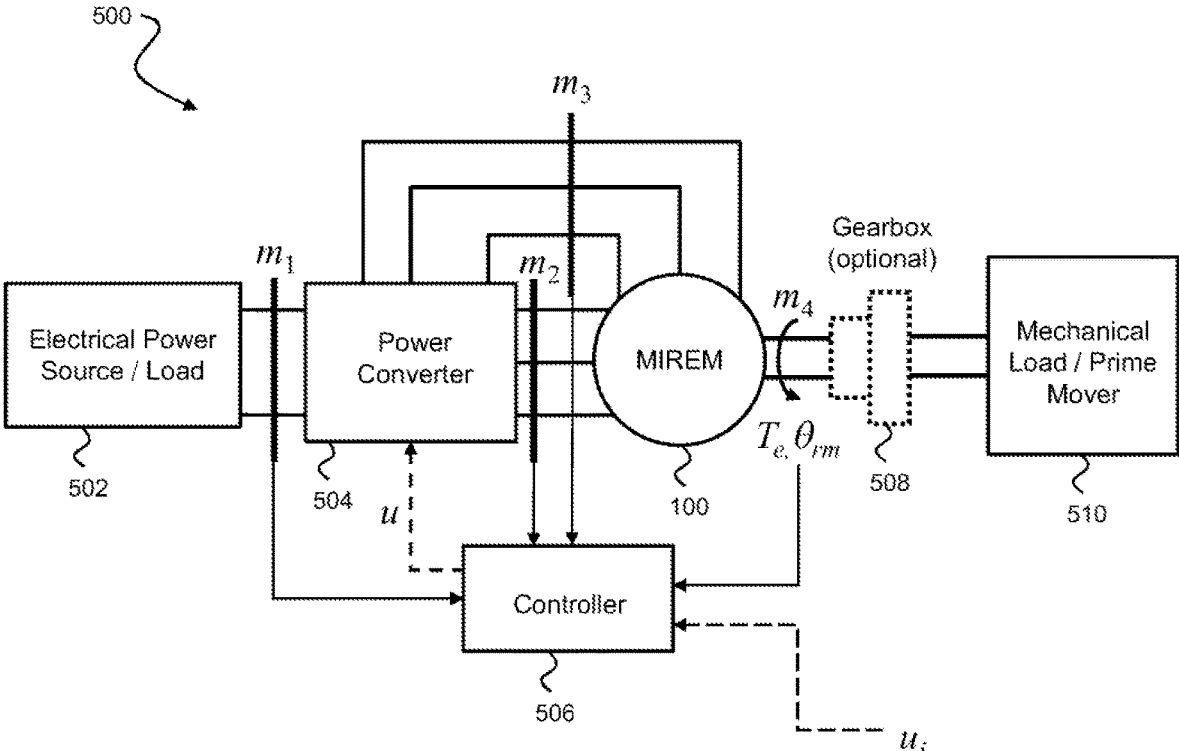
FIG. 9 is a schematic diagram of an example energy conversion system according to aspects of the present invention.

FIG. 9 is a schematic diagram of an example energy conversion system 500 driving a MIREM machine 100. Alternative example electric machines including the second and third examples illustrated in FIGS. 4 and 5 can also be driven by the example energy conversion system 500. The fourth example electric machine 400 modified to include a q-axis field winding can also be driven by the example energy conversion system 500.

The energy conversion system 500 is configured to i) provide electrical power in generation mode and/or ii) provide mechanical power in motoring mode. The energy conversion system 500 further includes a power converter 504, a controller 506, a position sensor (or estimator), and a mechanical load/prime mover 510. The system may also contain a torque sensor (or estimator) and a gearbox 508, situated between the electric machine 100 and the mechanical load/prime mover 510. Rotor position and/or torque measurements of the machine, $m_4$, obtained at the electrical machine shaft, and/or the voltage and/or current measurements, $m_1$, obtained at the DC terminal, and/or the voltage and/or current measurements, $m_2$, obtained at the machine 3-phase AC terminal, and/or the voltage and/or current measurements, $m_3$, obtained at the plurality of DC rotor field winding terminals, are detected and used as a feedback to the controller 506 to determine the appropriate field winding voltages and/or currents and apply the control signals a to achieve the appropriate field winding voltages and/or currents to the power converter 504. A position estimator can also be used to estimate position of the rotor and use the estimated position of the rotor as a feedback signal in a similar manner. A torque estimator can also be used to estimate torque on the electrical machine shaft and use the estimated torque on the electrical machine shaft as a feedback signal in a similar manner.

The system operating in power generation mode includes an electrical load 502, which is one of a single-phase alternating power load, a multi-phase alternating power load, a direct current power load, and other loads known to a person skilled in the pertinent art.

The system operating in motoring mode includes an electrical power source 502, which is one of a single-phase alternating power source, a multi-phase alternating power source, a direct current power source, and other sources known to a person having ordinary skill in the art. In some embodiments, the electrical power source represents a rechargeable electric vehicle battery or traction battery used to power the propulsion of an electric vehicle including the energy conversion system 500.

The power converter 504 interfaces with the electrical power source or load 502 and may be operating in AC/AC mode or AC/DC mode, with one AC side coupled to the electrical connection of the electric machine 100 and the other side coupled to the electrical power source 502. The converter 504 contains an additional DC side, comprised of at least one or a plurality of DC outputs, a first DC output coupled to the rotor q-axis field winding and a second DC output that may be coupled to the rotor d-axis field winding. The converter 504 includes of a plurality of switching devices, which may be of various types, including passive switches (e.g. diodes), semi-active switches (e.g. thyristors), and active switches (e.g. insulated-gate bipolar transistors "IGBTs").

If semi-active or active switches are used, the power converter 504 is configured to include an input coupled to an output of a controller 506 that provides the required control signals u. The controller receives signals, including measurements $m_1$ to $m_4$ from various system components as previously described, and the user input signal $u_i$, processes these signals in accordance with a controller algorithm, and produces the control signal u.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An electric machine comprising:
a magnetically permeable cylindrically shaped stator assembly comprising stator windings positioned within stator teeth; and
a rotor body extending through the stator assembly, configured to rotate circumferentially about a longitudinal axis within the stator assembly, comprising magnetically permeable material configured to conduct magnetic flux, and comprising a plurality of rotor slot clusters each comprising a plurality of rotor slots each extending longitudinally through the magnetically permeable material of the rotor body and comprising a nested semi-hexagonal slot pattern in a plane orthogonal to the longitudinal axis, the nested semi-hexagonal slot pattern being symmetrical about a d-axis of the rotor body and bisected by a perimeter of the rotor body, wherein each of the plurality of rotor slot clusters further comprises a tri-rectangular slot symmetrical about a q-axis of the rotor body and positioned between nested semi-hexagonal slot patterns.

2. An electric machine comprising:
a magnetically permeable cylindrically shaped stator assembly comprising stator windings positioned within stator teeth;
a rotor body extending through the stator assembly, configured to rotate circumferentially about a longitudinal axis within the stator assembly, comprising magnetically permeable material configured to conduct magnetic flux, and comprising a plurality of rotor slot clusters each comprising a plurality of rotor slots each extending longitudinally through the magnetically permeable material of the rotor body and comprising a nested semi-hexagonal slot pattern in a plane orthogonal to the longitudinal axis, the nested semi-hexagonal slot pattern being symmetrical about a d-axis of the rotor body and bisected by a perimeter of the rotor body; and
a rotor assembly comprising the rotor body, and for each of the plurality of rotor slot clusters, the rotor assembly comprises a rotor d-axis field winding extending through a first portion of slots in the nested semi-hexagonal slot pattern and a rotor q-axis field winding extending through a second portion of slots in the nested semi-hexagonal slot pattern,
wherein the rotor d-axis field winding is configured to carry current to produce magnetic flux aligned with the d-axis, and
wherein the rotor q-axis field winding is configured to carry current to produce magnetic flux aligned with a q-axis.

3. The electric machine of claim 2,
wherein the rotor q-axis field winding and rotor d-axis field winding together generate a magnetomotive force applicable on the stator assembly and which together with a magnetomotive force generated by the stator assembly applicable on the rotor body creates torque that causes rotation of the rotor body.

4. The electric machine of claim 2,
wherein, for each of the plurality of slot clusters, the rotor assembly comprises one or more permanent magnets positioned within a third portion of slots in the nested semi-hexagonal slot pattern and configured to produce magnetic flux aligned with the d-axis.

5. The electric machine of claim 4,
wherein for each of the plurality of rotor slot clusters, the nested semi-hexagonal slot pattern comprises a trapezoidal slot, a first semi-hexagonal slot pattern in which the trapezoidal slot is nested, and a second semi-hexagonal slot pattern in which the first semi-hexagonal slot pattern is nested, and
wherein the third portion of slots comprises the first semi-hexagonal slot pattern.

6. An electric machine comprising:
a magnetically permeable cylindrically shaped stator assembly comprising stator windings positioned within stator teeth;
a rotor body extending through the stator assembly, configured to rotate circumferentially about a longitudinal axis within the stator assembly, comprising magnetically permeable material configured to conduct magnetic flux, and comprising a plurality of rotor slot clusters each comprising a plurality of rotor slots each extending longitudinally through the magnetically permeable material of the rotor body and comprising a nested semi-hexagonal slot pattern in a plane orthogonal to the longitudinal axis, the nested semi-hexagonal slot pattern being symmetrical about a d-axis of the rotor body and bisected by a perimeter of the rotor body; and
a rotor assembly comprising the rotor body, and for each of the plurality of slot clusters, the rotor assembly comprises permanent magnets extending through a first portion of slots in the nested semi-hexagonal slot pattern and a rotor q-axis field winding extending through a second portion of slots in the nested semi-hexagonal slot pattern,
wherein the permanent magnets are configured to produce magnetic flux aligned with the d-axis, and wherein the rotor q-axis field winding is configured to carry current to produce magnetic flux aligned with a q-axis.

7. The electric machine of claim 6, wherein each of the plurality of rotor slot clusters further comprises a tri-rectangular slot symmetrical about a q-axis and positioned between nested semi-hexagonal slot patterns, and wherein the rotor assembly further comprises a rotor d-axis field winding extending through the tri-rectangular slot and configured to carry current to produce magnetic flux aligned with the d-axis.

8. An electric machine comprising:

a magnetically permeable cylindrically shaped stator assembly comprising stator windings positioned within stator teeth;

a rotor body extending through the stator assembly, configured to rotate circumferentially about a longitudinal axis within the stator assembly, comprising magnetically permeable material configured to conduct magnetic flux, and comprising a plurality of rotor slot clusters each comprising a plurality of rotor slots each extending longitudinally through the magnetically permeable material of the rotor body and comprising a nested semi-hexagonal slot pattern in a plane orthogonal to the longitudinal axis, the nested semi-hexagonal slot pattern being symmetrical about a d-axis of the rotor body and bisected by a perimeter of the rotor body; and a rotor assembly comprising the rotor body, and for each of the plurality of slot clusters, the rotor assembly comprises a rotor d-axis field winding extending through a first portion of slots in the nested semi-hexagonal slot pattern and permanent magnets extending through a second portion of slots in the nested semi-hexagonal slot pattern, wherein the rotor d-axis field winding is configured to carry current to produce magnetic flux aligned with the d-axis, and wherein the permanent magnets are configured to produce magnetic flux aligned with the d-axis.

9. The electric machine of claim 8, wherein for each of the plurality of slot clusters, the rotor assembly comprises a rotor q-axis field winding extending through a third portion of slots in the nested semi-hexagonal slot pattern, and wherein the rotor q-axis field winding is configured to carry current to produce magnetic flux aligned with a q-axis.

10. An electric machine comprising a rotor architecture configured to provide q-axis stator inductance and d-axis stator inductance such that the q-axis stator inductance is greater than the d-axis stator inductance, wherein a difference between the d-axis stator inductance and the q-axis stator inductance is proportional to a torque due to machine saliency when multiplied by a q-axis stator current and a d-axis stator current, and wherein the difference is a negative value.

11. An electric machine comprising a rotor architecture configured to provide q-axis stator inductance and d-axis stator inductance such that the q-axis stator inductance is greater than the d-axis stator inductance, wherein the rotor architecture comprises a rotor q-axis field winding centered about a d-axis, the q-axis field winding being configured to provide a q-axis flux linkage due to the rotor, wherein the rotor architecture comprises a rotor d-axis field winding configured to provide a d-axis flux linkage due to the rotor, and wherein a segment of the rotor d-axis field winding, comprising a tri-rectangular cross-sectional shape symmetrical about a q-axis, is configured to increase the d-axis flux linkage due to the rotor and is configured to reduce the d-axis flux linkage due to the rotor.

12. The electric machine of claim 11, wherein the rotor architecture is configured to provide q-axis rotor inductance and d-axis rotor inductance such that the q-axis rotor inductance is greater than the d-axis rotor inductance.

13. The electric machine of claim 12, wherein the q-axis flux linkage due to the rotor includes a q-axis rotor field flux linkage that is a product of the q-axis rotor inductance and q-axis rotor current through the rotor q-axis field winding, and wherein the d-axis flux linkage due to the rotor includes a d-axis rotor field flux linkage that is a product of the d-axis rotor inductance and d-axis rotor current through the d-axis field winding.

14. The electric machine of claim 12, wherein, as the q-axis stator current is reduced and the d-axis stator current is made more negative while machine speed is increased, a decrease in torque due to d-axis flux linkage due to the rotor is offset by an increase in torque due to q-axis flux linkage due to the rotor.

15. The electric machine of claim 14, wherein the torque due to d-axis rotor current is proportional to a product of the d-axis rotor inductance, the d-axis rotor current, and the q-axis stator current, and wherein the torque due to the q-axis rotor current is proportional to a product of the q-axis rotor inductance, the q-axis rotor current, and the d-axis stator current.

16. An energy conversion system comprising:

an electric machine comprising a rotor and a stator such that the rotor rotates within the stator, the rotor comprising a rotor d-axis field winding and a rotor q-axis field winding; and a power converter in electrical communication with the rotor d-axis field winding and the rotor q-axis field winding.

17. The energy conversion system of claim 16, wherein the stator comprises stator windings, wherein the power converter is configured to provide independent current sources to the rotor d-axis field winding and the rotor q-axis field winding, and wherein the power converter is configured to provide current into the stator windings.

18. The energy conversions system of claim 16, wherein the stator comprises stator windings, wherein the power converter is configured to provide independent current sources from the rotor d-axis field winding and the rotor q-axis field winding, and wherein the power converter is configured to receive current from the stator windings.

* * * * *